US006333584B1

(12) United States Patent
Jerman et al.

(10) Patent No.: US 6,333,584 B1
(45) Date of Patent: Dec. 25, 2001

(54) TILTABLE ELECTROSTATIC MICROACTUATOR AND METHOD FOR USING SAME

(75) Inventors: John H. Jerman, Palo Alto; John D. Grade, Mountain View, both of CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/755,743

(22) Filed: Jan. 5, 2001

Related U.S. Application Data
(60) Provisional application No. 60/174,457, filed on Jan. 5, 2000.

(51) Int. Cl.[7] .................................................. H02N 1/00
(52) U.S. Cl. ...................................... 310/309; 310/400 M
(58) Field of Search ................................... 310/309, 40 M

(56) References Cited

U.S. PATENT DOCUMENTS

| 5,000,534 | 3/1991 | Watanabe et al. | 350/96.2 |
|---|---|---|---|
| 5,025,346 | 6/1991 | Tang et al. | 361/283 |
| 5,153,870 | 10/1992 | Lee et al. | 369/111 |
| 5,428,259 | 6/1995 | Suzuki . | |
| 5,446,811 | 8/1995 | Field et al. | 385/23 |

(List continued on next page.)

FOREIGN PATENT DOCUMENTS

| 9-159939 | 12/1995 | (JP) . |
|---|---|---|
| WO 00/36447 | 6/2000 | (WO) . |
| WO 00/36740 | 6/2000 | (WO) . |
| WO 00/62410 | 10/2000 | (WO) . |

OTHER PUBLICATIONS

L.A. Field, et al., "Micromachined 1×2 Optical–fiber Switch", Sensors and Actuators A 53, 1996 Elsevier Science S.A., pp. 311–315.

V.R. Dhuler, et al.; "A Novel Two Axis Actuator for High Speed Large Angular Rotation", Transducers '97, 1997 International Conference on Solid–State Sensors and Actuators, Chicago, Jun. 16–19, 1997 IEEE, pp. 327–330.

(List continued on next page.)

*Primary Examiner*—Joseph Waks
(74) *Attorney, Agent, or Firm*—Flehr Hohbach Test Albritton & Herbert LLC

(57) ABSTRACT

A tiltable electrostatic microactuator comprising a substantially planar substrate and a rotatable member overlying the substrate for rotation about an axis of rotation extending perpendicular to the planar substrate. A plurality of comb drive assemblies are provided and each has a first comb drive member mounted on the substrate and a second comb drive member coupled to the rotatable member. Each of the first and second comb drive members is provided with comb drive fingers. First and second spaced-apart springs are included in the microactuator and each has a first end portion coupled to the substrate and a second end portion coupled to at least one of the second comb drive members for suspending the second comb drive members and the rotatable member over the substrate. The second comb drive members are movable in a direction of travel about the axis of rotation between a first position in which the comb drive fingers of the first and second comb drive members are not substantially fully interdigitated and a second position in which the comb drive fingers of the first and second comb drive members are substantially fully interdigitated. A controller is electrically coupled to the second comb drive members and the substrate for tilting the rotatable member relative to the substrate about a pivot axis extending parallel to the planar substrate. A method for using the microactuator is provided.

15 Claims, 2 Drawing Sheets

U.S. PATENT DOCUMENTS

| | | | |
|---|---|---|---|
| 5,742,712 | 4/1998 | Pan et al. | 385/18 |
| 5,748,812 | 5/1998 | Buchin | 385/18 |
| 5,753,911 | 5/1998 | Yasuda et al. | |
| 5,801,472 | 9/1998 | Wada et al. | |
| 5,850,375 | 12/1998 | Wilde et al. | 369/14 |
| 5,982,585 | 11/1999 | Fan et al. | 360/104 |
| 5,998,906 | 12/1999 | Jerman et al. | 310/309 |
| 6,133,670 | 10/2000 | Rodgers et al. | |
| 6,134,207 | 10/2000 | Jerman et al. | 369/112 |

OTHER PUBLICATIONS

E.H. Klaassen, et al.; "Silicon Fusion Bonding and Deep Reactive Ion Etching; A New Technology for Microstructures", Transducers '95—Eurosensors, International Conference on Solid–State Sensors and Actuators, and Eurosensors IX, Stockholm, Sweden, Jun. 25–29, 1995, pp. 556–569.

S. Kurth, et al.; "Silicon Mirrors and Micromirror Arrays for Spatial Laser Beam Modulation", Sensors and Actuators A66, 1998 Elsevier Science S.A., pp. 76–82.

M. Kiang, et al.; "Surface–micromachined Electrostatic–Comb Driven Scanning Micromirrors for Barcode Scanners", 1996 IEEE, pp. 192–197.

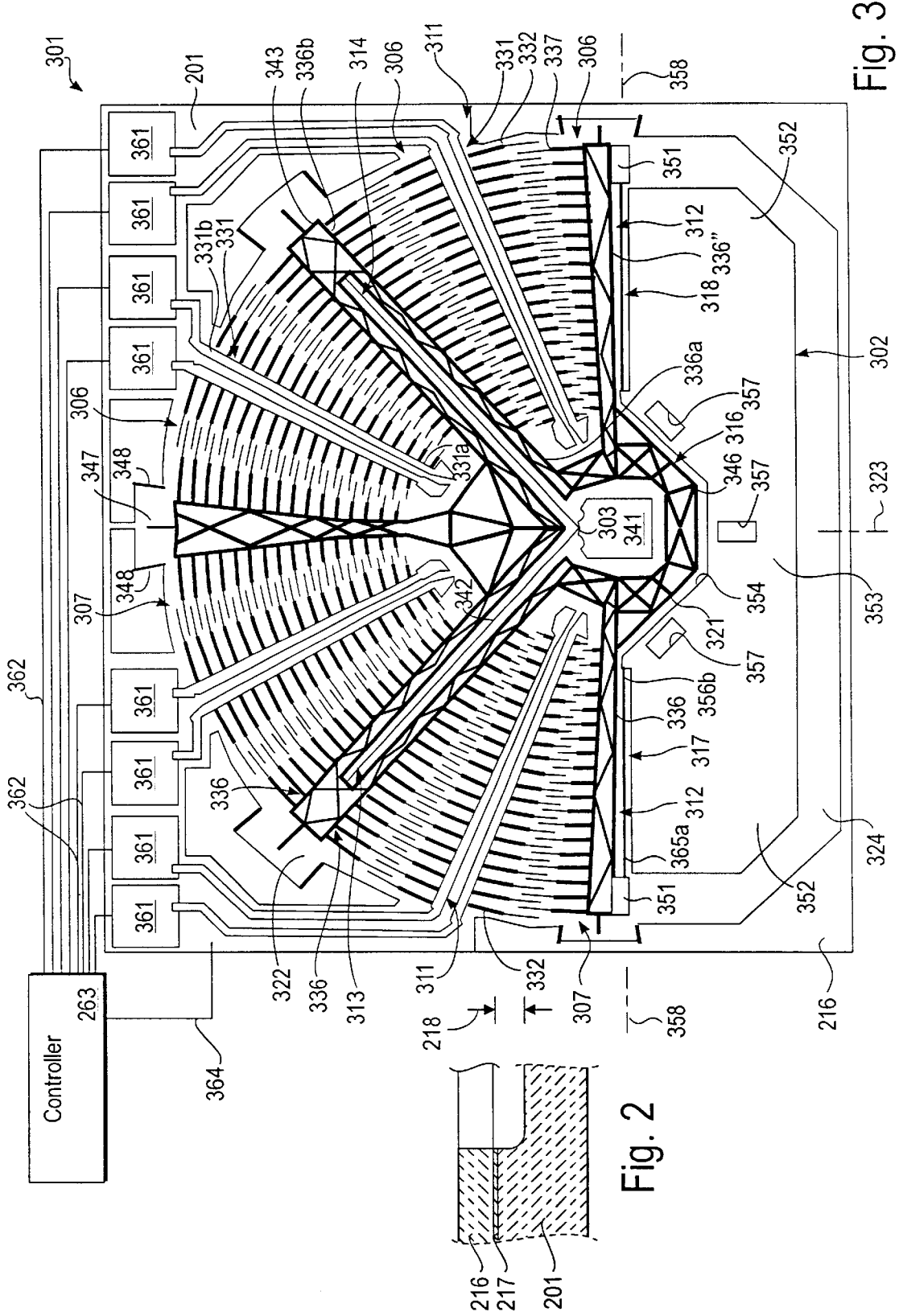

TILTABLE ELECTROSTATIC MICROACTUATOR AND METHOD FOR USING SAME

CROSS-REFERENCE TO RELATED APPLICATION

The application claims priority to U.S. provisional patent application Serial No. 60/174,457 filed Jan. 5, 2000, the entire content of which is incorporated herein by this reference.

SCOPE OF THE INVENTION

The present invention relates generally to electrostatic actuators and more particularly to rotary electrostatic microactuators with comb drive assemblies.

BACKGROUND

Many early rotating electrostatic motors used a central bearing with various arrangements of electrostatic stators around the motors to effect rotation. Unfortunately, these motors tended to have problems with friction at the central bearing and have had lifetime issues related to wear of the bearing. The motors typically acted as stepper motors where the rotor rotates with an incremental motion as the stator elements are attracted. Thus it was difficult to precisely adjust a plate to a particular angle with such motors.

Other angular motors have been described which use flexural elements to support a rotating element. Comb drive fingers are arranged in concentric arcs around a central flexural pivot, so that small angular motion is provided around the pivot. See, for example, D. A. Horsley, et al., "Angular Micropositioner for Disk Drives", Proceedings of the Tenth International Workshop on Micro Electro Mechanical Systems, 1997, pp 454–458; L.-S. Fan, et al., "Batch-Fabricated Area-Efficient Milli-Actuators", Proceedings 1994 Solid State Sensor and Actuator Workshop, Hilton Head, pp 38–42; T. Juneau, et al., "Dual Axis Operation of a Micromachined Rate Gyroscope", Proceedings 1997 International Conference on Solid State Sensors and Actuators, V.2, pp 883–890; E. H. Klaassen, et al., "Silicon Fusion Bonding and Deep Reactive Ion Etching; A New Technology for Microstructures", The 8th International Conference on Solid-State Sensors and Actuators, and Eurosensors IX, Stockholm, Sweden, Jun. 25–29, 1995, pp 556–559; W. C. Tang, et al., "Laterally Driven Polysilicon Resonant Microstructures", Sensors Actuators 20, 1989, pp 25–31 (IEEE reprint pp. 53–59) and U.S. Pat. No. 5,025,346 to Tang et al. Unfortunately, all of these devices provide a limited angular range of motion.

Other electrostatic microactuators with improved angular range of motion have been provided for rotating devices such as optical components. See, for example, International Publication No. WO 00/36740 to Jerman et al. It has been found, however, that such components may require additional positional adjustments during use due to initial placement errors or subsequent misalignments resulting from temperature changes or other environmental factors.

In general, it is an object of the present invention to provide a rotary electrostatic microactuator having a movable member that can be adjusted during use in a direction other than its primary direction of angular motion.

Another object of the invention is to provide a rotary electrostatic microactuator of the above character in which the movable member can be tilted about an axis extending substantially parallel to the substrate of the microactuator.

Another object of the invention is to provide a rotary electrostatic microactuator of the above character in which the movable member can be tilted relative to the movable comb drives of the microactuator.

SUMMARY OF THE INVENTION

The present invention provides a tiltable electrostatic microactuator comprising a substantially planar substrate and a rotatable member overlying the substrate for rotation about an axis of rotation extending perpendicular to the planar substrate. A plurality of comb drive assemblies are provided and each has a first comb drive member mounted on the substrate and a second comb drive member coupled to the rotatable member. Each of the first and second comb drive members is provided with comb drive fingers. First and second spaced-apart springs are included in the microactuator and each has a first end portion coupled to the substrate and a second end portion coupled to at least one of the second comb drive members for suspending the second comb drive members and the rotatable member over the substrate. The second comb drive members are movable in a direction of travel about the axis of rotation between a first position in which the comb drive fingers of the first and second comb drive members are not substantially fully interdigitated and a second position in which the comb drive fingers of the first and second comb drive members are substantially fully interdigitated. A controller is electrically coupled to the second comb drive members and the substrate for tilting the rotatable member relative to the substrate about a pivot axis extending parallel to the planar substrate. A method for using the microactuator is provided.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

FIG. 2 is a cross-sectional view of the rotary electrostatic microactuator of FIG. 1 taken along the line 2—2 of FIG. 1.

FIG. 3 is a plan view of another embodiment of the rotary electrostatic microactuator of the present invention.

DESCRIPTION OF THE INVENTION

Figure 1:
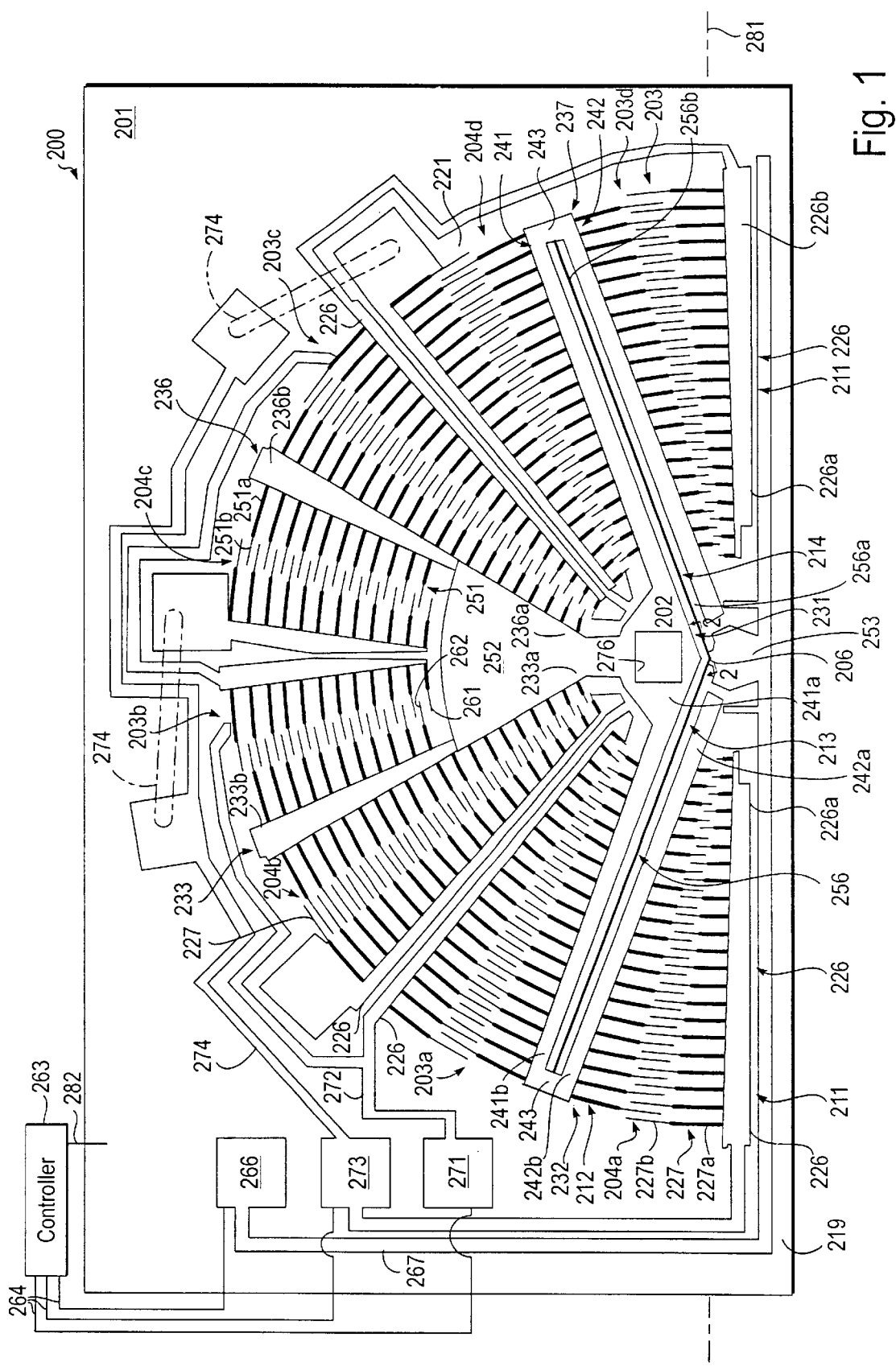
FIG. 1 is a plan view of a rotary electrostatic microactuator of the present invention.

Rotary electrostatic microactuator 200 of the present invention is formed on a planar substrate 201 (see FIGS. 1 and 2). A rotatable member or mirror holder 202 overlies substrate 201. A plurality of first and second comb drive assemblies 203 and 204 are carried by the substrate 201 for rotating the mirror holder 202 in first and second opposite directions about an axis of rotation 206 extending perpendicular to planar substrate 201. The axis of rotation is shown as a point in FIG. 1 and labeled by reference line 206. Each of the first and second comb drive assemblies 203 and 204 includes a first drive member or comb drive 211 mounted on substrate 201 and a second comb drive member or comb drive 212 overlying the substrate. First and second spaced-apart springs 213 and 214 are included in microactuator 200 for supporting or suspending second comb drives 212 and mirror holder 202 above the substrate 201 and for providing radial stiffness to the second comb drives 212 and the mirror holder 202.

Substrate 201 is made from any suitable material such as silicon and is preferably formed from a silicon wafer. The substrate has a thickness ranging from 200 to 600 microns and preferably approximately 400 microns. Mirror holder 202, first and second comb drive assemblies 203 and 204 and first and second springs 213 and 214 are formed atop the substrate 201 by a second or top layer 216 made from a wafer of any suitable material such as silicon. Top wafer 216 has a thickness ranging from 10 to 200 microns and preferably approximately 85 microns and is secured to the substrate 201 by any suitable means. The top wafer 216 is preferably fusion bonded to the substrate 201 by means of a silicon dioxide layer 217 having a thickness ranging from 0.1 to two microns and preferably approximately one micron. Top wafer 216 may be lapped and polished to the desired thickness. The silicon dioxide layer 217 further serves as an insulator between the conductive top wafer 216 and the conductive substrate 201. The mirror holder 202, the first and second comb drive assemblies 203 and 204 and the first and second springs 213 and 214 are formed from the top wafer 216 by any suitable means. Preferably, such structures are etched from wafer 216 using deep reactive ion etching (DRIE) techniques. Mirror holder 202 is spaced above substrate 201 by an air gap 218, that ranges from three to 30 microns and preferably approximately 15 microns, so as to be electrically isolated from the substrate.

At least one and preferably a plurality of first comb drive assemblies 203 are included in rotary electrostatic microactuator 200 and disposed about axis of rotation 206 for driving mirror holder 202 in a clockwise direction about axis of rotation 206. At least one and preferably a plurality of second comb drive assemblies 204 can be included in microactuator 200 for driving the mirror holder in a counterclockwise direction about the axis of rotation 206. Each of the first and second comb drive assemblies 203 and 204 extends substantially radially from axis of rotation 206 and the assemblies 203 and 204, in the aggregate, subtend an angle of approximately 180° to provide the semicircular or fan-like shape to microactuator 200. More particularly, microactuator 200 has four first comb drive assemblies 203a, 203b, 203c and 203d and four second comb drive assemblies 204a, 204b, 204c and 204d. The first comb drive assemblies 203 are interspersed between the second comb drive assemblies 204. The rotary microactuator 200 has a base 219 extending along a diameter of the semicircle formed by the microactuator 200 and an outer radial extremity 221 resembling the arc of a semicircle. Radial extremity 221 has first and second ends which adjoin the first and second opposite ends of base 219. The radial extremity 221 is defined by the outer radial extremities of first and second comb drive assemblies 203 and 204. First comb drive assemblies 203 are symmetrically disposed relative to second comb drive assemblies 204 about the radial centerline of rotary electrostatic microactuator 200, that is the imaginary line extending in the plane of substrate 201 through axis of rotation 206 perpendicular to base 219. Mirror holder 202 and axis of rotation 206 are disposed at the center of microactuator 200 adjacent base 219. The rotary microactuator has a length measured along base 219 ranging from 500 to 5,000 microns and preferably approximately 2,000 microns.

First comb drive 211 of each of first and second comb drive assemblies 203 and 204 is mounted to substrate 201 by means of silicon dioxide layer 217. As such, the first comb drives 211 are immovably secured to substrate 201. Each of the first comb drives 211 has a radial-extending bar 226 provided with a first or inner radial portion 226a and a second or outer radial portion 226b. The outer portion 226b of each first comb drive 211 extends to outer radial extremity 221. A plurality of comb drive fingers 227 are longitudinally spaced apart along the length of bar 226 at a separation distance ranging from eight to 50 microns and preferably approximately 35 microns. The comb drive fingers 227 extend substantially perpendicularly from bar 226 and are each preferably arcuate in shape. In a preferred embodiment, piecewise linear segments are used to form the comb fingers 227 for approximating such an arcuate shape. Fingers 227 have a length ranging from 25 to 190 microns and increase substantially linearly in length from bar inner portion 226a to bar outer portion 226b. Each of the comb drive fingers 227a has a proximal portion 227a and a distal portion 227b. The proximal portion 227 has a width ranging from four to 20 microns and preferably approximately 10 microns, and the distal portion 227b has a width less than the width of proximal portion 227a and, more specifically, ranging from two to 12 microns and preferably approximately six microns.

Second comb drives 212 and mirror holder 202 are part of a movable or rotatable frame 231 spaced above substrate 201 by air gap 218 so as to be electrically isolated from the substrate and movable relative to the substrate and first comb drives 211. Frame 231 includes a first arm 232, a second arm 233, a third arm 236 and a fourth arm 237, each of which extend in a substantial radial direction from axis of rotation 206. First and fourth arms 232 and 237 are symmetrically disposed relative to the centerline of microactuator 200 and second and third arms 233 and 236 are also symmetrically disposed relative to such centerline. First and fourth arms 232 and 237 are each U-shaped in conformation and formed from first and second bars 241 and 242. The first bar 241 has a first or inner radial portion 241a in close proximity to axis 206 and a second or outer radial portion 241b that extends to outer radial extremity 221. Similarly, second bar 242 has a first or inner radial portion 242a and a second or outer radial portion 242b. Outer radial portions 241b and 242b are joined by a base member or connector 243 at outer radial extremity 221. Inner radial portion 241a of the first bar 241 is joined to mirror holder 202, while inner radial portion 242a of second bar 242 extends freely adjacent the mirror holder 202. Second and third arms 233 and 236 are joined at their inner portions to mirror holder 202.

First bar 241 of first arm 232 forms part of second comb drive 212 of first comb drive assembly 203a, while second bar 242 of first arm 232 serves as part of the second comb drive 212 of second comb drive assembly 204a. A plurality of comb drive fingers 251 are longitudinally spaced apart along the length of such first bar 241 for forming the comb drive fingers of first comb drive assembly 203a, while a plurality of comb drive fingers 251 are longitudinally spaced apart along the length of second bar 242 of such first arm 232 for forming the comb drive fingers of first comb drive assembly 204a. Comb drive fingers 251 are substantially similar to comb drive fingers 227 and have a first or proximal portion 251a joined to the respective bar 241 or 242 and a second or distal portion 251b extending from such proximal portion 251a. Distal portions 251b have a width less than the width of proximal portions 251a. Preferably arcuate comb drive fingers 251 are offset relative to comb drive fingers 227 so that comb drive fingers 251 can interdigitate with comb drive fingers 227. First bar 241 of fourth arm 237 similarly serves as part of second comb drive 212 of second comb drive assembly 204d, while second bar 242 of the fourth arm 237 serves as part of the second comb drive 212 for first comb drive assembly 203d. Comb drive fingers 251 extend from first and second bars 241 and 242 of fourth arm 237.

Second and third arms 233 and 236 are included in second comb drives 212 of first comb drive assemblies 203b and 203c and second comb drive assemblies 204b and 204c. The second arm 233 has a first or inner radial portion 233a joined to mirror holder 202 and a second or outer radial portion 233b adjacent outer radial extremity 221. Third arm 236 is similar in construction to second arm 233 and has a first or inner radial portion 236a and a second or outer radial portion 236b. A first plurality of comb drive fingers 251 are longitudinally spaced apart along the length of one side of second arm 233 for forming the second comb drive of second comb drive assembly 204b and a second plurality of comb drive fingers 251 are longitudinally spaced apart along the length of the other side of second arm 233 for forming the second comb drive of first comb drive assembly 203b. Similarly, a first plurality of comb drive fingers 251 are longitudinally spaced apart along one side of third arm 236 for forming second comb drive 212 of first comb drive assembly 203c and a second plurality of comb drive fingers 251 are longitudinally spaced apart along the opposite side of the third arm 236 for forming second comb drive 212 of second comb drive assembly 204c. The second and third arms 233 and 236 can optionally be joined by a link 252 at the respective inner radial portions 233 and 236a for enhancing the rigidity of the arms 233 and 236.

The inner radial portions 241a of the bars 241 of first and fourth arms 232 and 237 and link 252 are included within the means of microactuator 200 for coupling rotatable member or mirror holder 202 to second comb drives 212 and more specifically in the means of microactuator 200 for rigidly coupling the mirror holder 202 to the second comb drives 212.

Means including first and second spaced-apart springs 213 and 214 are included within rotary electrostatic microactuator 200 for movably supporting mirror holder 202 and second comb drives 212 over substrate 201. Springs 213 and 214 are symmetrically disposed about the centerline of microactuator 200 and can have a length which approximates the length of at least some of first and second comb drive assemblies 203 and 204. Base 219 of microactuator 200 includes an attachment or bracket member 253 which has a portion intersecting axis of rotation 206 and serves to secure or couple first and second springs 213 and 214 to substrate 201. Each of the springs 213 and 214 is formed from a single beam-like spring member 256 having a first or inner radial end portion 256a joined at its end to bracket member 253, so as to be coupled to substrate 201, and a second or outer radial end portion 256b joined to connector 243 of the respective first arm 232 or fourth arm 237, so as to be coupled to second comb drives 212. More specifically, first spring 213 extends from bracket member 253 up the center of first arm 232 for joinder to the center of connector 243. Second spring 214 extends from bracket member 253 radially outwardly through the center of fourth arm 237 for joinder to the center of base member 243. Inner end portions 256a of spring members 256 are joined to the bracket member 253 at axis of rotation 206. The spring members 256 each have a width ranging from one to 10 microns and preferably approximately four microns. Respective first and fourth arms 232 and 237 serve to secure outer end portions 256b of the first and second springs 213 and 214 to mirror holder 202.

At least one comb drive assembly and preferably at least one first comb drive assembly 203 and at least one second comb drive assembly 204 is disposed between first and second springs 213 and 214. More specifically, first comb drive assemblies 203b and 203c and second comb drive assemblies 204b and 204c, each of which is formed in part by second and third arms 233 and 236, are angularly disposed between first and second springs 213 and 214. Additionally, first comb drive assembly 203a and second comb drive assembly 204d, symmetrically disposed relative to each other about the centerline of microactuator 200, are angularly disposed between first and second springs 213 and 214.

At least one and as shown all of first and second comb drive assemblies 203 and 204 are not centered along a radial extending outwardly from axis of rotation 206. In this regard, distal ends 261 of comb drive fingers 227 for each comb drive assembly 203 or 204 are aligned along an imaginary line that does not intersect axis of rotation 206 and, as such, is spaced-apart from the axis 206. Similarly, distal ends 262 of comb fingers 251 extend along an imaginary line which does not intersect axis of rotation 206. Each of first and second comb drive assemblies 203 and 204 thus resembles a sector of a semicircle that is offset relative to a radial of such semicircle.

Second comb drives 212 of first and second comb drive assemblies 203 and 204 are each movable in a direction of travel about axis of rotation 206 between a first or rest position, as shown in FIG. 1, in which comb drive fingers 227 and 251 are not substantially fully interdigitated and a second position (not shown) in which comb drive fingers 227 and 251 are substantially fully interdigitated. Although comb drive fingers 227 and 251 are shown as being partially interdigitated when second comb drives 212 are in their first positions, the comb fingers 227 and 251 can be fully disengaged and thus not interdigitated when second comb drives 212 are in their first positions. In microactuator 200, distal portions 227b and 251b of the comb drive fingers are substantially interdigitated when the comb drives 211 and 212 are in their at rest positions. When in their second positions, comb fingers 251 of second comb drives 212 extend between respective comb drive fingers 227 of the first comb drives 211. Comb fingers 251 approach but preferably do not engage bar 226 of the respective first comb drives 211 and similarly comb drive fingers 227 approach but preferably do not engage bar 241 of the respective second comb drives 212.

Each second comb drive 212 of the first comb drive assemblies 203 is in its second position when each second comb drive 212 of the second comb drive assemblies 204 is in a third position (not shown), in which the comb fingers 123 and 127 are more fully spaced apart and disengaged than when in their first position. Similarly, each second comb drive 212 of the assemblies 204 is in its second position when each second comb drive 212 of the assemblies 203 is in its third position.

Electrical means is included within microactuator 200 for driving second comb drives 212 between their first and second positions. Such electrical means can include a controller and voltage generator 263 electrically connected to a plurality of electrodes provided on the substrate 201 by means of a plurality of electrical leads 264. Such electrodes include a ground or common electrode 266 electrically coupled by lead 267 to bracket member 253, at least one drive electrode 271 coupled directly or by means of lead 272 to first comb drive 211 of first comb drive assemblies 203 and one or more drive electrodes 273 coupled directly or by means of lead 274 to first comb drives 211 of second comb drive assemblies 204. Several leads 274 extending out of the plane of microactuator 200 are shown in phantom lines in FIG. 1. A metal layer (not shown) made from aluminum or any other suitable material is created on the top surface of top wafer 216 for creating the electrodes and leads.

Means in the form of a closed loop servo control can be included in microactuator 200 for monitoring the position of second comb drives 212 and thus mirror holder 202. For example, controller 263 can determine the position of the movable comb drives 212 about axis of rotation 206 by means of a conventional algorithm included in the controller for measuring the capacitance between comb drive fingers 227 of the movable comb drives 212 and comb drive fingers 251 of the stationary comb drives 211. A signal separate from the drive signal to the comb drive members can be transmitted by controller 263 to the microactuator for measuring such capacitance. Such a method does not require physical contact between the comb drive fingers. Alternatively, where microactuator 200 is used in an optical system, a portion of the output optical energy coupled into the output fiber can be diverted and measured and the drive signal from the controller 263 to the microactuator 200 adjusted until the measured optical energy is maximized.

In an exemplary operation, rotary electrostatic microactuator 200 can be used as part of a fiber-optic network of a telecommunications system. In such a use, a micromirror (not shown) can be mounted to mirror holder 202, for example by means of insertion into a recess or slot 276 provided in the mirror holder 202, for rotation about axis of rotation 206. The mirror extends out of the plane of microactuator 200 and has a reflective face (not shown) which preferably intersects axis of rotation 206. The recess 276 for receiving mirror need not be centered on axis of rotation 206.

Mirror holder 202 can be rotated in opposite first and second directions of travel about axis of rotation 206 by means of controller 263. When it is desired to rotate the mirror holder in a clockwise direction about axis 206, a voltage potential is supplied by the controller to first comb drives 211 of first comb drive assemblies 203 so as to cause comb fingers 251 of the second comb drives 212 of first comb drive assemblies 203 to be electrostatically attracted to comb fingers 227 of such first comb drives 211. Such attraction force causes comb drive fingers 251 to move towards and interdigitate with comb drive fingers 227. The amount of such interdigitation, and thus the amount of rotation of mirror holder 202 about axis 206, can be controlled by the amount of voltage supplied to first comb drives 211 of first comb drive assemblies 203. When and if it is desired to rotate mirror holder 202 in a counterclockwise direction about axis 206, a suitable voltage potential can be supplied to first comb drives 211 of second comb drive assemblies 204 to cause comb drive fingers 251 of the respective second comb drives 212 to move towards and interdigitate with comb drive fingers 227 of the second comb drive assemblies 204. As can be seen, the second comb drive members 212 of one of first comb drive assemblies 203 or second comb drive assemblies 204 are in their second positions when second comb drive members 212 of the other of second comb drive assemblies 204 or first comb drive assemblies 203 are in their third positions.

Suitable voltage potentials to electrodes 271 and 273 for so rotating mirror holder 202 can range from 20 to 250 volts and preferably range from 60 to 180 volts. Microactuator 200 is capable of +/− six degrees of angular rotation, that is a rotation of six degrees in both the clockwise and counterclockwise directions for an aggregate rotation of twelve degrees, when such drive voltages are utilized. The amount of angular deflection is dependent on the number of comb fingers 227 and 251, the gap between the comb fingers and the length and width of the first and second springs 213 and 214.

The use of radially-extending springs 213 and 214 within electrostatic microactuator 200 enhances the stability of the microactuator and thus facilitates relatively large angular rotations of mirror holder 202. Springs 213 and 214 provide a radial stiffness to microactuator 200 which limits sidewise movement of comb fingers 251 as they interdigitate with comb fingers 227. Such radial stiffness thus inhibits any sidewise snap over which may otherwise occur between comb fingers 227 and 251. Inner end portions 256a of spring members 256 advantageously join to substrate 201 at the point of intersection of axis of rotation 206 with the substrate. Outer end portions 256b of the springs 213 and 214 are coupled to second comb drives 212 either directly or by means of rotatable frame 231 adjacent outer radial extremity 221. Springs 213 and 214 are angularly spaced apart at an angle ranging from approximately 90° to 160° and preferably approximately 135° to constrain microactuator 200 against linear accelerations. The nonfolded springs 213 and 214 require less surface area for deflection than folded springs and thus permit more surface area to be allocated to comb drive assemblies 203 and 204.

The thickness of the movable structures of microactuator 200 affects the stiffness to off axis modes. Thus, a high aspect ratio device is preferred and the movable structures have a thickness substantially greater than the width of the smallest features of microactuator 20. In this manner, out-of-plane stiffness of the structures is relatively great, substantially constraining motion to that in the plane of the microactuator 200.

First and second comb drive assemblies 203 and 204 are relatively densely packed within rotary electrostatic microactuator 200. Such packing is permitted, in part, by the offset nature of the comb drive assemblies 203 and 204 of both first and second comb drive assemblies 203 and 204. As discussed above, distal ends 261 and 262 of comb drive fingers 227 and 251 and the radial centerline of each of first and second comb drive assemblies 203 and 204 do not intersect axis of rotation 206. This offsetting of comb drive assemblies 203 and 204 also permits inner radial portions 226a of bars 226 to have a greater width, and thus have increased stability, and permit comb drive fingers 227 and 251 at the inner proximal end portions of each comb drive assembly 203 and 204 to be larger in length than would be permitted for a microactuator of comparable comb drive density but having comb drive assemblies 203 and 204 that are radially aligned with axis of rotation 206. As such, relatively greater rotational forces and torque are permitted by electrostatic microactuator 200.

The configuration of comb drive fingers 227 and 251 also permits relatively greater rotational forces in microactuator 200. In this regard, comb drive fingers 227 and 251 are partially interdigitated when in their at rest positions shown in FIG. 1. Since the spacing between adjacent comb drive fingers 227 and 251 can be limited by available etching techniques, distal portions 227b and 251b of the comb drive fingers 227 and 251 have been narrowed in width. Upon movement of second comb drives 212 to their second positions, distal portions 251b interdigitate with proximal portions 227a of the comb drive fingers of first comb drive 211 and the spacing or gap between adjacent comb drive fingers 227 and 251 is decreased so as to enhance the electrostatic attraction forces between first and second comb drives 211 and 212.

The semi-circular or fan-like shape of rotary electrostatic microactuator 200 permits axis of rotation 206, and for example the mirror carried by the microactuator, to be placed close to a GRIN lens or other component of the fiber-optic system.

Although microactuator 200 has been disclosed for use in a fiber-optic network of a telecommunications system, it should be appreciated that the microactuator 200, for use with or without a mirror, has other applications. For example, microactuator 200 can be used in an optical switch or other component of an optical data storage system of the type described in copending U.S. patent application Ser. No. 09/135,236 filed Aug. 17, 1998, the entire content of which is incorporated herein by this reference, in optical scanners, optical spectrometers, optical phase compensators or in other structures for rotating components such as optical waveplates, mirrors or diffraction gratings. An exemplary use of microactuator in an optical switch of a telecommunications system is disclosed in copending U.S. patent application Ser. No. 09/464,373 filed Dec. 15, 1999, the entire content of which is incorporated herein by this reference.

Microactuator 200 can be optionally configured to pivot or tilt mirror holder 202 about an axis 281 extending perpendicular to axis of rotation 206. Pivot axis 281 preferably extends in the plane of first and second springs 213 and 214 and in a direction parallel to base 219 (see FIG. 1). Springs 213 and 214 have a significantly large angular separation, shown in FIG. 1 as being approximately 135°, to permit second comb drives 212, mirror holder 202 and the mirror or other object carried by the mirror holder 202 to be pivoted by the springs 213 and 214 between a first position where mirror holder 202 and second comb drive 212 extend substantially parallel to substrate 201 and a second position in which the mirror holder 202 and the second comb drives 212 are inclined about pivot axis 281 towards the substrate 201. For relatively small rotations of the mirror holder about axis of rotation 206 and tilts of the mirror holder about pivot axis 281, the spring constants of each of first and second springs 213 and 214 are independent. Thus, the mirror holder 202 will tilt roughly the same amount for a given vertical force regardless of the rotation angle about axis 206.

Means is included within electrostatic microactuator 200 for driving second comb drives 212 and mirror holder 202 between their first and second positions. In one preferred embodiment, controller 263 is electrically coupled to substrate 201 by means of an additional lead 282 so as to be included within such pivot drive means. Means in the form of a closed loop servo control can be included within microactuator 200, and more specifically within controller 263, for determining the position of second comb drives 212 and mirror holder 202 about pivot axis 281 relative to substrate 201. For example, controller 263 can include a conventional algorithm of the type discussed above with respect to microactuator 200 for measuring the capacitance between second comb drives 212 and substrate 201. Alternatively, or in addition, where microactuator 202 is used in an optical system, a portion of the output optical energy coupled into the optical fiber by the mirror carried by mirror holder 202 can be diverted and measured and the drive signal from controller 263 to the microactuator 200 thereafter adjusted so that such measured optical energy is maximized.

In one preferred method of tilting second comb drives 212, a drive voltage is supplied by controller 263 to the conductive substrate 201 for biasing the substrate 201 and thus electrostatically pivoting or tilting the grounded second comb drives 212 and the mirror holder 202 in unison about pivot access 281 towards the substrate. Such drive voltage can range from 20 to 200 volts and preferably approximately 100 volts. It should be appreciated that other means for providing a voltage differential between second comb drives 212 and substrate 201 can be provided and be within the scope of the present invention. Second comb drives 212 and mirror holder 202 can be pivoted about pivot axis 281 over an angle ranging from 0.1 to 0.5 degrees and preferably through an angle of approximately 0.2 degrees when such drive voltages are utilized.

The pivoting of mirror holder 202 relative to substrate 201 is advantageous in that it permits adjustment of the object carried by mirror holder 202. For example, a micromirror, diffraction grating or other object component carried by the mirror holder 202 can be adjusted to compensate for positional errors or subsequent misalignment, for example as a result of temperature gradients experienced by the optical switch or other apparatus utilizing microactuator 200. Precise positioning of the object carried by mirror holder 202 can thus be attained.

Other rotary electrostatic microactuators can be provided for rotating an object, such as a micromirror or diffraction grating, about an axis of rotation extending perpendicular to the microactuator and for pivoting the object about a secondary axis extending substantially perpendicular to such axis of rotation. In another preferred embodiment of a rotary electrostatic microactuator of the present invention, shown in plan in FIG. 3, an electrostatic microactuator 301 is provided for rotating a movable member 302 about an axis of rotation 303 extending perpendicular to the plane of microactuator 302. Microactuator 301 has similarities to microactuator 200 and like reference numerals have been used to describe like components of microactuators 200, and 301. In general, movable or rotatable member 302 overlies substrate 201. A plurality of first and second comb drive assemblies 306 and 307 are carried by substrate 201 for rotating the rotatable member or mirror holder 302 in first and second opposite directions about axis of rotation 303. Each of the comb drive assemblies 306 and 307 includes a first comb drive member or comb drive 311 mounted on substrate 201 and a second comb drive member or comb drive 312 overlying the substrate. First and second space-apart spring members or springs 313 and 314 are included in microactuator 301 for supporting or suspending second comb drives 312 above the substrate 201 and for providing radial stiffness to the second comb drives 312 and mirror holder 302. The second comb drives 312 are part of a movable structure or rotatable frame 316 which is coupled to mirror holder 302 by means of first and second torsional spring members or springs 317 and 318.

Mirror holder 302, first and second comb drive assemblies 306 and 307, first and second springs 313 and 314, rotatable frame 316 and first and second torsional springs 317 and 318 are formed from top layer 216 by any suitable means such as discussed above for microactuator 200. Alternatively, such components can be formed by means of the Lithographie Gavanometrie and Abformung (LIGA) process. Each of such techniques permit such structures to have a high aspect ratio and thus enhance the out-of-plane stiffness of the structures.

As least one and preferably a plurality of first comb drive assemblies 306 are included in microactuator 301 and disposed about axis rotation 303 for driving mirror holder 302 in a clockwise direction about the axis of rotation 303. At least one and preferably a plurality of second comb drive assemblies 307 are additionally included in the microactuator for driving the mirror holder in a counterclockwise direction about axis of rotation 303. Each of the first and second comb drive assemblies 306 and 307 extends substantially radially from axis of rotation 303 and the assemblies 306 and 307, in the aggregate, subtend an angle that is less than 360°, preferably approximately 180° or less and more preferably approximately 180° about axis 303 to provide the semicircular or fan-like shape of microactuator 301. The rotary microactuator 301 has abase 321 extending substantially along a diameter of the microactuator and an outer radial extremity 322 substantially similar to outer radial extremity 221. The base 321 extends substantially perpendicular to a radial centerline 323 of microactuator 301. Mirror holder 302 and axis of rotation 303 are disposed at the center of microactuator 301 adjacent base 321. Substrate 201 further includes a projection 324 that extends beyond base 321 in a direction opposite to the first and second comb drive assemblies 306 and 307.

First and second comb drive assemblies 306 and 307 are symmetrically disposed about the radial centerline 323 of microactuator 301. The first or stationary comb drive 311 of each of first and second comb drive assemblies 306 and 307 is mounted on substrate 201 in the manner discussed above with respect to first comb drives 211. Each of the first comb drives 311 has a bar 331 extending substantially in a radial direction that is provided with a first or inner radial portion 331a and a second or outer radial portion 331b. The outer portion of each first or stationary comb drive bar 331 extends to outer radial extremity 322 of the microactuator 301. A plurality of first comb drive fingers or stationary comb fingers 332 extend from one side of each bar 331 in longitudinally spaced-apart positions along the length of the bar. Stationary comb fingers 332 are substantially similar to comb fingers 227 described above.

Second or movable comb drive 312 of each of first and second comb drive assemblies 306 and 307 is suspended above substrate 201 by first and second springs 313 and 314. Each of the movable comb drives 312 has a bar 336 extending substantially in a radial direction that is provided with a first or inner radial portion 336a and a second or outer radial portion 336b. The outer portion 336b of each of movable bars 336 extends to outer radial extremity 322 of microactuator 301. A plurality of second or movable comb drive fingers or comb fingers 337 extend from one side of each movable bar 336 in longitudinally spaced-apart positions along the length of the bar 336. The movable bars 336 extending along the radial centerline of 323 of microactuator 301 are joined back-to-back so that the comb fingers 337 of such comb drives 312 extend from each of the opposite sides of such combined movable comb drive 312. Movable comb fingers 337 are substantially similar to comb fingers 251 discussed above.

Comb fingers 332 and 337 can be of any suitable size and shape and are preferably arcuate in shape. In a preferred embodiment, piecewise linear segments are used to form each of the comb fingers 332 and 337 for approximating such an arcuate shape. The comb fingers 332 and 337 can each extend perpendicularly from the respective bar 331 or 336. In the embodiment illustrated, at least one and as shown all of first and second comb drive assemblies 306 and 307 are not centered along a radial extending outwardly from axis of rotation 303. As such, and in the manner discussed above with respect to microactuator 200, each of the first and second comb drive assemblies 306 and 307 resembles a sector of a semicircle that is offset relative to a radial of such semicircle. Comb fingers 332 and 337 thus preferably extend from their respective bars 331 or 336 at an oblique angle so as to extend substantially along an arcuate centered on axis of rotation 303.

Means including first and second spaced-apart springs 313 and 314 are included with in rotary electrostatic microactuator 301 for movably supporting mirror holder 302 and movable comb drives 312 over substrate 201. Springs 313 and 314 are symmetrically disposed about radial centerline 323 and preferably have a length which approximates the length of at least some of first and second comb drive assemblies 306 and 307. An attachment or bracket member 341 is joined to substrate 201 at base 321 and has a portion intersecting axis of rotation 303 that serves to secure or couple first and second springs 313 and 314 to the substrate 201. Each of springs 313 and 314 is formed from a single beam-like spring member 342 that extends radially outwardly from bracket member 341 between adjacent movable bars 336. The outer radial portions 336 of such adjacent movable bars 336 are joined by a connector 343. Each spring member 342 has a first or inner radial end portion secured to bracket member 341, so as to be coupled to substrate 201, and a second or outer radial end portion secured to a connector 343, so as to be coupled to the movable comb drives 312. The spring members 342 each have a width ranging from one to ten microns and preferable approximately four microns and are angularly spaced apart about axis 303 an angle ranging from 60° to 120° and preferably approximately 90°. At least one and as shown two first comb drive assemblies 306 and two second comb drive assemblies 307 are disposed between the first and second springs 313 and 314.

Movable comb drives 312 are part of rotatable frame 316. In this regard, the inner radial portions 336a of the movable bars 336 are joined together by means of a central or portion or ring 346 of rotatable frame 316. Central ring 346 extends around bracket 341 and is provided with first and second openings therein to permit respective first and second springs 313 and 314 to project radially outwardly between adjacent movable bars 336.

Rotatable frame 316, and thus mirror holder 302 carried thereby, is movable in first and second opposite angular directions about axis of rotation 303. Movement of the second comb drives 312 of first comb drive assemblies 306 from their first positions, shown in FIG. 3, to their second positions (not shown), in which the respective comb fingers thereof are substantially fully interdigitated, results in rotatable frame 316 rotating in a clockwise position about the axis 303. Similarly, movement of the second comb drives 312 of second comb drive assemblies 307 from their first positions, shown in FIG. 3, to their second positions (not shown), in which the respective comb fingers thereof are substantially fully interdigitated, results in frame 316 rotating in a counterclockwise direction about axis 303. When the second comb drives 312 of one of the first and second comb drive assemblies 306 and 307 move to their second positions, the second comb drives 312 of the other of the first and second comb drive assemblies 306 and 307 move to their third positions (not shown), in which the comb fingers thereof are spaced apart and fully disengaged. Rotatable frame 316 is capable rotating six degrees in each direction, for an aggregate rotation between its extreme angular positions of approximately twelve degrees.

Movable comb fingers 337 and stationary comb fingers 332 can optionally be inclined and offset relative to each other in the manner disclosed in copending U.S. patent application Ser. No. 09/727,794 filed Nov. 29, 2000, the entire content of which is incorporated herein by this reference. When the comb fingers 337 and 332 are so formed, each movable comb fingers 337 is offset from an imaginary centerline extending between adjacent stationary comb fingers 332 when in its first position and is substantially centered on such centerline when in its second position in which the movable comb fingers 337 are substantially fully interdigitated with the stationary comb fingers 332.

Means is included in rotary electrostatic microactuator 301 for limiting the angular rotation of movable frame 316 about axis of rotation 313. In this regard, a bumper 347 extends radially outwardly from each movable bar 336 and engages one of first and second stops 348 when rotatable frame 316 is in one of its extreme angular positions about the axis of rotation 303.

First and second movable bars 336' and 336" extend from opposite sides of central ring 346 along base 321 of rotary electrostatic microactuator 301. These bars 336' and 336" preferably extend, in a collinear manner, along an imaginary line disposed parallel to the base 321 and extending through bracket member 341. A bracket 351 is joined to the outer radial portion 336b of each of the first and second movable bars 336' and 336".

Mirror holder 302 can be of any suitable size and shape. The mirror holder preferably extends radially from axis of rotation 303 in a direction, along radial centerline 323, that is substantially opposite to the direction in which second or movable comb drives 312 extend from the axis of rotation along the radial centerline 323. As shown, the mirror holder 302 is approximately rectangular in shape and has first and second end portions 352 extending alongside respective first and second movable bars 336' and 336". The mirror holder 302 has a central portion 353 provided with a cutout 354 into which a portion of central ring 346 protrudes. The mirror holder 302 has a length approximating the diameter, and thus the base 321, of microactuator 301. Mirror holder 302 has a relatively short radial dimension extending parallel to substrate to 201. In the embodiment illustrated, such dimension is the width of mirror holder 302, which is measured along the radial centerline 323 of the microactuator 301, and ranges from 200 to 500 microns and preferably approximately 350 microns. The planar mirror holder 302 can have any suitable thickness between its top and bottom planar surfaces and preferably has a thickness ranging from 10 to 200 microns and more preferably approximately 85 microns.

First and second torsional springs 317 and 318 are included in the means of microactuator 301 for coupling rotatable member or mirror holder 302 to second comb drives 312 and, more specifically, are included in the means of microactuator 301 for flexibly coupling the mirror holder 302 to the second comb drives 312. In this regard, springs 317 and 318 serve to flexibly join and electrically couple mirror holder 302 to respective first and second brackets 351. Each of first and second torsional springs 317 and 318 is formed from a torsional member 356, substantially similar to spring member 342, having a first or outer radial end portion 356a joined to a bracket 351 and a second or inner radial end portion 356b joined to central portion 353 of the mirror holder 302. The torsional members 356 preferably extend along a line that is preferably parallel to first and second movable bars 336' and 336" so that first and second torsional springs 317 and 318 are collinear.

A movable device such as a micromirror or diffraction grating can be mounted to platform 302 in any suitable manner. In one preferred embodiment, the mirror holder 302 is provided with at least one and as shown a plurality of three holes or slots 357 extending therethrough for receiving one or more posts or other suitable support members for mounting the movable device to the mirror holder 302. The operative surface of such a device, such as the reflective surface of a micromirror, can be cantilevered over bracket member 341 so that axis of rotation 303 extends through such operative surface.

Mirror holder 302, second comb drive assemblies 307, the remainder of rotatable frame 316, first and second springs 313 and 314, and first and second torsional springs 317 and 318 are each spaced above substrate 201 by air gap 218 so as to be electrically isolated from the substrate 201.

Mirror platform or holder 302 is pivotable by torsional springs 317 and 318 between first and second positions about a pivot axis 358 that extends parallel to the plane of substrate 201 and thus perpendicular to axis of rotation 303. The pivot axis 363 preferably extends along first and second torsional springs 317 and 318, which permit such pivotable movement of the mirror holder 302 relative to projection 324. In the first position, mirror holder 302 extends substantially parallel over projection 324. In the second position, the mirror holder is inclined about pivot axis 363 downwardly towards the projection 324.

Electrical means is included within microactuator 301 for driving movable comb drives 312 between their first and second positions. Such electrical means can include a controller and voltage generator, such as controller 263, that is electrically connected to a plurality of electrodes provided on substrate 201 by means of plurality of electrical leads. Such electrodes, each of which is substantially similar to the electrodes discussed above with respect to microactuator 200, include a ground or common electrode such as bracket member 341 that is electrically coupled to the controller 361 by a lead (not shown) for permitting electrical control signals to be supplied to movable comb drives 312 and mirror holder 302. At least one and as shown a plurality of eight drive electrodes 361 are mounted on substrate 201 and are electrically coupled to respective stationary bars 331 by means of respective leads 362 for permitting electrical control signals to be supplied by the controller 263 to stationary comb drives 311. Controller 263 can optionally includes means of the type discussed above with respect to microactuator 200 for monitoring the position of rotatable frame 316. An additional lead 364 electrically couples controller 263 to substrate 201.

In operation and use, rotary electrostatic microactuator 301 can be operated substantially in the manner discussed above with respect to microactuator 200. In one preferred method of operation, suitable voltage potentials to bracket member 341 and drive electrodes 361 for rotating mirror holder 302 and rotatable frame 316 about axis of rotation 303 can range from 20 to 250 volts and preferably range from 60 to 180 volts. Microactuator 301 is capable of +/−six degrees of angular rotation, that is a rotation of six degrees in both the clockwise and counterclockwise directions for an aggregate rotation of twelve degrees, when such drive voltages are utilized.

Controller 263 can optionally be utilized to provide suitable drive signals to substrate 201, including projection 324 thereof, for preferably biasing the substrate and thus electrostatically pivoting or tilting mirror holder 302 about pivot axis 358 relative to the substrate. The substantially collinear relationship of first and second torsional springs 317 and 318 facilitates pivoting of the mirror holder at pivot axis 358. The relatively small separation angle between first and second springs 313 and 314, discussed above as being approximately 90°, inhibits the second comb drives 312 from tilting towards substrate 201 when the substrate is so electrically biased to tilt mirror holder 302. Thus, mirror holder 302 is tilted relative to both substrate 201 and second comb drives 312. Suitable voltage potentials to substrate projection 324 for so pivoting mirror holder 302 can range from 10 to 200 volts and preferably range from 40 to 120 volts. In the embodiment illustrated, a tilt ranging from zero to two degrees and preferably approximately 0.5 degrees can be obtained with such voltages to adjust the position of mirror holder 302 and the device carried thereby. The mirror holder 302 can be pivoted at any time during the operation of microactuator 301, The relatively short width of mirror holder 302 permits greater angular pivotal movement of the micromirror or other device carried thereby about pivot axis 336 than if such micromirror or device was mounted on a structure having a larger radial dimension, such as second comb drive assemblies 307. In this manner, larger angular adjustments can be made to the micromirror or other device being moved by microactuator 301 when desired for the reasons discussed above with respect to microactuator 200. The angle of pivot about axis 358 is limited by the size of the air gap 218 between mirror holder 302 and substrate 201. Accordingly, greater pivotal movement of the mirror holder 302 can be provided when air gap 218 is increased, although such an increase in the size of air gap 218 requires increased drive voltages to substrate 201.

It should be appreciated that the invention hereof is broad enough to cover any rotary electrostatic actuator that is approximately fan-like in shape or approximately semicircular or that has comb drive assemblies which subtend an angle of 180° or less, for example 90°, about an axis of rotation. Such configurations permit the axis of rotation to be placed adjacent a base or end of the microactuator. Such a rotary electrostatic microactuator preferably includes arcuate comb drive fingers which extend in an angular direction about the axis of rotation. The invention is also broad enough to cover any rotary electrostatic microactuator having beam-like springs which secure to the substrate at the point at which the axis of rotation intersects the substrate.

It should be appreciated that a rotary electrostatic microactuator of the type described herein can be provided with prebent springs or suspensions of the type disclosed in U.S. Pat. No. 5,998,906 that issued Dec. 7, 1999 or in copending U.S. patent application Ser. No. 09/135,236 filed Aug. 17, 1998 and be within the scope of the present invention. Such prebent springs are nonlinear and thus in a "bent" condition when at rest in a static undeflected condition. The spring members of such springs straighten towards a linear condition as the comb drive fingers interdigitate and thus increase in axial stiffness during interdigitation. Such an embodiment of a rotary electrostatic microactuator can be provided with two or more prebent springs, one or more springs which straighten during interdigitation of comb drive fingers driving the microactuator in a first direction and one or more springs which straighten during interdigitation of comb drive fingers driving the microactuator in an opposite second direction. Use of such prebent springs results in improved stiffness in the springs at or near the maximum travel of the comb drives and accompanying structure, which is particularly important in microactuators having large deflections.

Rotary electrostatic microactuators can be provided which incorporate various features of the microactuators herein. Rotary electrostatic microactuators that use arcuate comb drive fingers can be circular in shape or have other noncircular shapes such as fan-like shapes or shapes resembling the sector or segment of a circle. Radially-extending springs that are prebent or linear when in their rest positions can be used. The comb drive assemblies of the microactuator can be centered on a radial or offset from a radial. The comb drive fingers can be spaced apart or partially interdigitated when in their rest positions and can have a variety of shapes. Tiltable movable or rotatable members can be provided.

As can be seen from the foregoing, a rotary electrostatic microactuator having a movable member that can be adjusted during use in a direction other than its primary direction of angular motion has been provided. The rotary electrostatic microactuator can be tilted about an axis extending substantially parallel to the substrate of the microactuator. In one embodiment, the rotary electrostatic microactuator can be tilted relative to the movable comb drives of the microactuator.

What is claimed is:

1. A tiltable electrostatic microactuator comprising a substantially planar substrate, a rotatable member overlying the substrate for rotation about an axis of rotation extending perpendicular to the planar substrate, a plurality of comb drive assemblies, each of the comb drive assemblies having a first comb drive member mounted on the substrate and a second comb drive member, means for coupling the rotatable member to the second comb drive members, each of the first and second comb drive members being provided with comb drive fingers, first and second spaced-apart springs, each of the first and second springs having a first end portion coupled to the substrate and a second end portion coupled to at least one of the second comb drive members for suspending the second comb drive members and the rotatable member over the substrate, the second comb drive members being movable in a direction of travel about the axis of rotation between a first position in which the comb drive fingers of the first and second comb drive members are not substantially fully interdigitated and a second position in which the comb drive fingers of the first and second comb drive members are substantially fully interdigitated, and a controller electrically coupled to the second comb drive members and the substrate for electrostatically tilting the rotatable member relative to the substrate about a pivot axis extending parallel to the planar substrate.

2. A microactuator as in claim 1 wherein the pivot axis extends perpendicular to the axis of rotation.

3. A microactuator as in claim 1 wherein the plurality of comb drive assemblies subtend an angle of approximately 180° or less about the axis of rotation so as to have a fan-like shape.

4. A microactuator as in claim 3 wherein the plurality of comb drive assemblies form a semicircle having a base extending substantially along a diameter of the semicircle, the axis of rotation being disposed adjacent the base at the center of the semicircle.

5. A microactuator as in claim 1 wherein the means for coupling the rotatable member to the second comb drive members includes means for rigidly coupling the rotatable member to the second comb drive members so that the second comb drive members tilt about the pivot axis in unison with the rotatable member.

6. A microactuator as in claim 1 wherein the means for coupling the rotatable member to the second comb drive members includes means for flexibly coupling the rotatable member to the second comb drive members so that the rotatable member tilts about the pivot axis relative the substrate and the second comb drive members.

7. A microactuator as in claim 6 wherein the means for flexibly coupling the rotatable member to the second comb drive members includes first and second torsional members, each of the torsional members having a first end portion coupled to the second comb drive members and a second end portion coupled to the rotatable member.

8. A microactuator as in claim 7 wherein the first and second torsional members are collinear and extend parallel to the planar substrate.

9. A microactuator as in claim 6 wherein the second comb drive members extend radially from the axis of rotation in a first direction and the rotatable member extends radially from the axis of rotation in a second direction opposite to the first direction.

10. A microactuator as in claim 1 wherein each of the first and second springs extends substantially radially from the axis of rotation and wherein the plurality of comb drive assemblies include first and second comb drive assemblies disposed between the first and second springs.

11. A method for operating an electrostatic microactuator having a substantially planar substrate and a rotatable member and a plurality of comb drive assemblies, the rotatable member overlying the substrate for rotation about an axis of rotation extending perpendicular to the planar substrate, each of the comb drive assemblies having a first comb drive member mounted on the substrate and a second comb drive member coupled the rotatable member, each of the first and second comb drive members being provided with comb drive fingers, the second comb drive members and the rotatable member being suspended over the substrate by first and second spaced-apart springs and being movable in a direction of travel about the axis of rotation between a first position in which the comb drive fingers of the first and second comb drive members are not substantially fully interdigitated and a second position in which the comb drive fingers of the first and second comb drive members are substantially fully interdigitated, the method comprising the steps of tilting the rotatable member relative to the substrate about a pivot axis extending parallel to the planar substrate.

12. The method of claim 11 wherein the tilting step includes the step of tilting the second comb drive members relative to the substrate about the pivot axis.

13. The method of claim 11 wherein the tilting step includes the step of tilting the rotatable member relative to the second comb drive members about the pivot axis.

14. The method of claim 11 wherein the tilting step includes the step of electrostatically tilting the rotatable member relative to the substrate.

15. The method of claim 14 wherein the tilting step includes the step of applying a voltage differential between the rotatable member and the substrate.

* * * * *